United States Patent [19]

Maruyama et al.

[11] Patent Number: 4,732,344
[45] Date of Patent: Mar. 22, 1988

[54] DEVICE FOR PREVENTING THE DROPPING-OFF OF THE DRAG WASHER OF A FISHING REEL

[75] Inventors: Kenji Maruyama; Toshiaki Yorikane, both of Hiroshima, Japan

[73] Assignee: Ryobi Ltd., Hiroshima, Japan

[21] Appl. No.: 878,041

[22] Filed: Jun. 24, 1986

[30] Foreign Application Priority Data

Jun. 28, 1985 [JP] Japan ............................. 60-99998[U]

[51] Int. Cl.⁴ .............................................. A01K 89/00
[52] U.S. Cl. ........................... 242/84.5 A; 242/84.2 R
[58] Field of Search .................. 242/84.2 R, 84.21 R, 242/84.5 R, 84.51 R, 84.5 A, 84.51 A

[56] References Cited

U.S. PATENT DOCUMENTS

| | | | |
|---|---|---|---|
| 2,865,662 | 12/1958 | Nurmse | 242/84.2 R X |
| 2,911,165 | 11/1959 | Sarah | 242/84.5 A X |
| 3,682,411 | 8/1972 | Dumbauld | 242/84.2 R |
| 3,693,901 | 9/1972 | Lilland et al. | 242/84.2 R |
| 4,535,953 | 8/1985 | Omori | 242/84.21 R |
| 4,549,702 | 10/1985 | Councilman | 242/84.5 A |

*Primary Examiner*—Stuart S. Levy
*Assistant Examiner*—Thomas R. Hannon
*Attorney, Agent, or Firm*—Finnegan, Henderson, Farabow, Garrett & Dunner

[57] ABSTRACT

A device for retaining the drag washers of a fishing reel when the drag mechanism is disassembled. A flexible wire spring engages a groove on the inner portion of a recess in the spool and a groove on the outer surface of the outermost drag washer.

5 Claims, 4 Drawing Figures

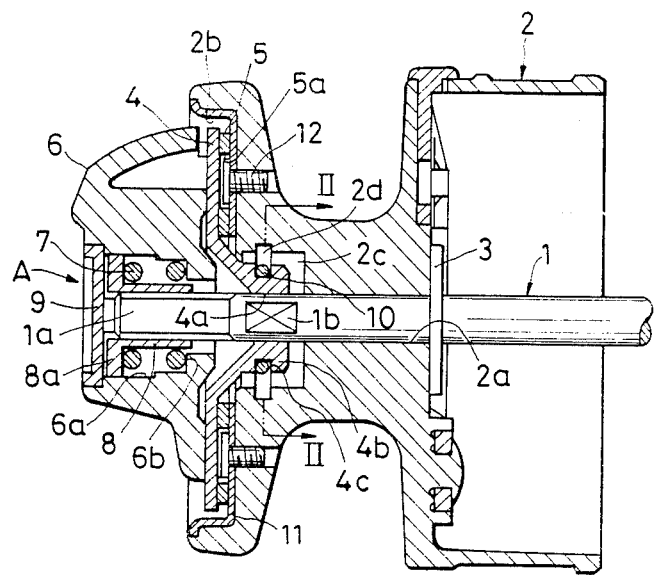
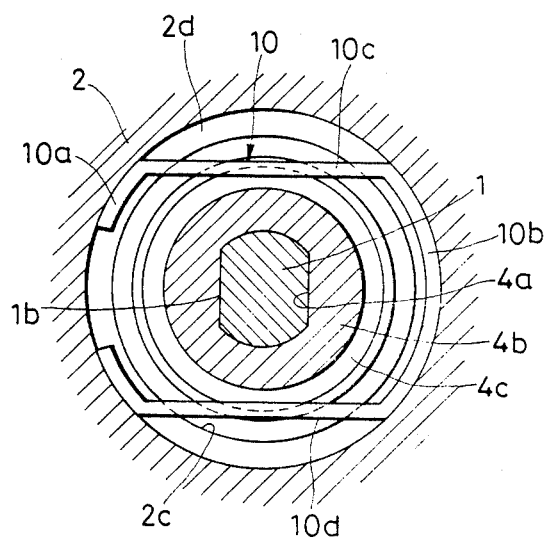
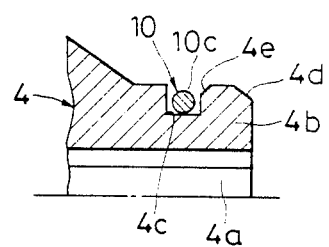
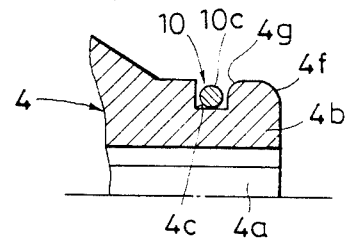

DEVICE FOR PREVENTING THE DROPPING-OFF OF THE DRAG WASHER OF A FISHING REEL

CROSS-REFERENCE TO RELATED PATENT APPLICATION

This patent application is related to U.S. patent application, Ser. No. 06/875,689, filed June 18, 1986.

BACKGROUND OF THE INVENTION

1. Field of the Invention

The present invention relates to a device for preventing the dropping-off of the drag washer of a reel used for fishing.

2. Description of the Related Art

A conventional spinning reel of the front drag type has a drag mechanism in which a plurality of drag washers are fitted around a spool shaft and located in the recess on the front of a spool fitted on the spool shaft. These drag washers are allowed to rotate around the spool shaft but cannot move in the axial direction. A drag knob screwed to the end portion of the spool shaft pushes against the drag washers to tighten the spool by a desired force. In the conventional spinning reel, a means for keeping the drag washers from dropping off during removal of the drag knob from the reel when replacing the spool includes a stopper lockring attached to the open peripheral portion of the recess of the spool. For that reason, a tool is needed to remove the stopper lockring from the reel when replacing a fatigued or damaged drag washer with a new drag washer. Removing the stopper lockring is difficult and troublesome, making the replacement of the drag washer time consuming.

Alternatively, the recess is hot-calked to prevent the drag washers from dropping-off. If the recess is hot-calked, the drag washer cannot be replaced.

SUMMARY OF THE INVENTION

The present invention was designed to solve the above-mentioned problems.

It is an object of the present invention to provide a device for a fishing reel in which the outermost of a plurality of drag washers fitted around a spool shaft and located in the recess of the front of a spool does not rotate around the spool shaft but slides in the axial direction. A groove is provided on the peripheral surface of the lower portion of the outmost drag washer and a flexible wire spring is fitted in the spool and removably engaged in the groove of the outermost drag washer. With this device, the drag washers can be prevented from dropping off when the drag knob is removed to replace the spool. The device makes it easy to attach and detach the drag washers without tools.

The device is provided for a fishing reel which has a drag mechanism in which the plurality of drag washers are fitted around the spool shaft and located in the recess of the front of the spool fitted on the spool shaft. These drag washers, excepting the outermost drag washer, are allowed to rotate around the spool shaft but cannot move in the axial direction. The outermost drag washer is fitted on the spool shaft so that it cannot rotate around the spool shaft but can slide in the axial direction thereof. The groove is provided on the peripheral surface of the lower portion of the outermost drag washer, and the flexible wire spring is fitted in the spool and removably engaged in the groove of the outermost drag washer to solve the above-mentioned problems.

Because the flexible wire spring fitted in the spool is pushed open against its elastic force and then engaged in the groove on the peripheral surface of the lower portion of the outermost drag washer, the drag washers can be easily replaced with new ones by pushing or pulling the outermost drag washer against the force of the flexible wire spring without having to use a tool.

BRIEF DESCRIPTION OF THE DRAWINGS

FIG. 1 shows a longitudinal sectional view of a drag washer dropping-off prevention device for a fishing reel, which is an embodiment of the present invention.

FIG. 2 shows an enlarged cross-sectional view along a line II—II in FIG. 1.

FIGS. 3(A) and 3(B) show enlarged longitudinal sectional views of a main portion of the device.

DESCRIPTION OF THE PREFERRED EMBODIMENT

An embodiment of the present invention is now described in detail with reference to the drawings. FIGS. 1 and 2 show a spool shaft 1 supported on the body of a reel (not shown) so that the spool shaft can be moved back and forth only in the axial direction. Spool shaft 1 is inserted into mounting hole 2a extending through the central portion of spool 2. Spool 2 is removably fitted on spool shaft 1 so that the spool can be rotated around the spool shaft but a stopper ring 3 secured to spool shaft 1 keeps spool 2 from being moved toward the right as shown in FIG. 1.

The front of spool 2 has recesses 2b and 2c concentric to mounting hole 2a. A plurality of drag washers 4 and 5 are provided in recess 2b. Spool shaft 1 extends through drag washers 4 and 5. Drag knob 6 is screwed to the threaded tip portion 1a of spool shaft 1. Drag knob 6 can be spirally moved back and forth in the axial direction thereof by the force of drag spring 7 to push drag washers 4 and 5 toward spool 2 to tighten the spool by a desired force.

A nut 8 having a flange 8a is fitted in central stepped hole 6a of drag knob 6 so that nut 8 cannot be rotated around its axis but can be slid in the axial direction thereof. Lid 9 is fitted in the outer portion of central hole 6a to keep nut 8 from dropping off. Drag spring 7 is supported at the ends thereof on flange 8a of nut 8 and step 6b of central hole 6a of drag knob 6. Nut 8 is screwed on threaded portion 1a of spool shaft 1 to attach drag knob 6 to spool shaft 1. As a result, drag knob 6 can be turned to push drag washers 4 and 5 by the resilient force of drag spring 7.

Outermost drag washer 4 is provided with a hole 4a shaped as a notched circle, as shown in FIG. 2. Notched portion 1b of spool shaft 1 is fitted in hole 4a of outermost washer 4 so that the washer cannot be rotated around spool shaft 1 but can be slid in the axial direction. Boss 4b of drag washer 4 protrudes toward spool 2 and has hole 4a extending through the central port of boss 4b. Annular groove 4c is provided on the peripheral surface of boss 4b. Flexible wire spring 10, fitted in spool 2, is removably engaged in groove 4c.

Flexible wire spring 10 is partly shaped as a parallelogram and partly shaped as a circle, as shown in FIG. 2. Flexible wire spring 10 is fitted in annular groove 2d of the internal circumferential surface of spool 2 as the diameter of flexible spring 10 is reduced against its resilient force acting in such a direction as to increase the diameter. When wire spring 10 is fitted in annular groove 2d, the diameter of the spring is increased by its resilient force so that arcuate portions 10a and 10b of the flexible spring on its major axis are resiliently engaged in groove 2d. As a result, flexible spring 10 does not drop off. Boss 4b of drag washer 4 is pushed in between straight portions 10c and 10d of flexible wire spring 10 on its minor axis so that straight portions 10c and 10d are pushed open outwardly in the radial direction of the flexible spring. After that, straight portions 10c and 10d are returned to their original positions and engaged in groove 4c, as shown in FIG. 2.

The peripheral edge of the tip of boss 4b and its inner edge on groove 4c are chamfered into flat slopes 4d and 4e on round slopes 4f and 4g, as shown in FIG. 3(A) or 3(B), so that straight portions 10c and 10d of the flexible wire spring 10 can be easily engaged and disengaged into and out of groove 4c of drag washer 4 by pushing and pulling boss 4b into and out of wire spring 10.

Heat radiation plate 11 is secured in recess 2b of the front of spool 2 by screws 12. Drag washers 4 and 5 are piled on heat radiation plate 11. Drag washer 5 is provided with holes 5a in which the heads of screws 12 are fitted so that washer 5 can be rotated together with spool 2. However, since the present invention is not confined to such a construction, drag washer 5 may be placed on the bottom surface of recess 2b of spool 2 or drag washer 4 may be placed on the bottom surface of recess 2b of spool 2 and heat radiation plate 11.

The present invention has been disclosed in terms of preferred embodiments. The invention is not limited thereto and is defined in the appended claims and includes their equivalents.

What is claimed is:

1. A drag device for a spinning reel comprising:
    a spool shaft;
    a spool rotatably fitted on said spool shaft, said spool having a recess formed therein;
    a plurality of drag washers arranged within said recess and including an outermost drag washer removably mounted on said spool shaft, said plurality of drag washers each having a friction surface;
    a drag knob removably mounted on an end of said spool shaft adjustably forcing said friction surface of said plurality of drag washers into engagement to provide a drag force therebetween;
    a first groove extending along an inner peripheral surface of said recess;
    a second groove annularly disposed along an outer peripheral surface of said outermost drag washer and radially aligned with said first groove; and
    a flexible spring frictionally engaged with said spool along said first groove and extending within said second groove of said outermost drag washer to retain said plurality of drag washers within said recess, said flexible spring being resiliently mounted within said first and second grooves for removing said outermost drag washer by urging said outermost drag washer against said flexible spring.

2. The drag device as set forth in claim 1, wherein said flexible spring is a polygon having at least one straight portion.

3. The drag device as set forth in claim 1, wherein said flexible spring is a wire having two parallel straight portions and two arcuate portions at each end, said arcuate portions resiliently engaging said spool within said groove and said straight portions extending within said second groove of said outermost drag washer.

4. The drag device as set forth in claim 3, wherein said outermost drag washer includes a boss portion extending in a direction normal to said friction surface, said second groove disposed along said boss portion.

5. The drag device as set forth in claim 4, wherein said boss portion includes flat slope portions proximate a periphery of said second groove to bias said flexible spring open when removing or replacing said outermost drag washer.

* * * * *